Oct. 14, 1941.           G. F. GARDNER            2,259,132
TEMPERATURE MEASURING DEVICE
Filed June 1, 1940
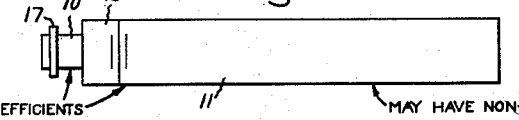
HAVE DIFFERENT COEFFICIENTS OF EXPANSION.        MAY HAVE NON-REFLECTING SURFACE.
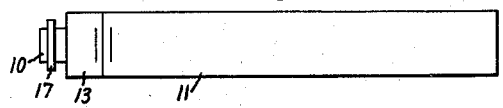
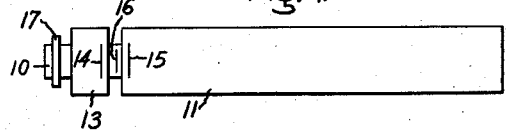
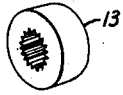      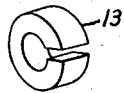
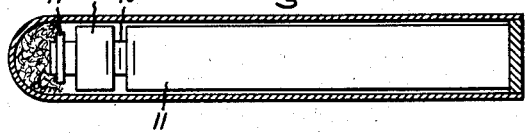
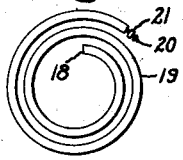
Inventor:
George F. Gardner,
by Harry E. Dunham
His Attorney.

Patented Oct. 14, 1941

2,259,132

UNITED STATES PATENT OFFICE 2,259,132

TEMPERATURE MEASURING DEVICE

George F. Gardner, Alplaus, N. Y., assignor to General Electric Company, a corporation of New York Application June 1, 1940, Serial No. 338,345

6 Claims. (Cl. 73—364)

My invention relates to the measurement of extreme temperatures or extreme radiant energy conditions and is particularly useful for the measurement and recording of such temperatures and conditions in locations or under conditions where such measurements by usual methods would be difficult or impossible or prohibitively expensive.

In carrying my invention into effect, I make use of the difference in the temperature coefficient of expansion of different materials. A portable temperature measuring and recording device embodying my invention may consist of a rod of one material enclosed by slightly shorter tubes of another material, the two being secured together at one end and having a friction tight collar on the rod adjacent the free end of the tube, the arrangement being such that the collar is pushed along the rod by the tube due to the unequal expansion of the two materials when subjected to temperature changes and remains in a position and produces a record corresponding to the extreme temperature to be measured.

The position reached by the collar gives a permanent record of such extreme temperature reached by the device and the device may be examined at leisure through a microscope to ascertain the displacement and hence the temperature with high accuracy. Such a device is small, inexpensive and rugged in construction. For example, the device may have a maximum length of about one inch and an outside diameter of .03 of an inch. It may be used in a flame or in a liquid or in a solid such as ice. It is low in cost, requires no wiring or other attachments, is rugged in construction and its indication or record remains permanent until the device is reset. When used under conditions where the materials are likely to be destroyed as by an acid, the unit may be enclosed in a sealed protective casing resembling a capsule.

The features of my invention which are believed to be new and patentable will be pointed out in the claims appended hereto. For a better understanding of my invention, reference is made in the following description to the accompanying drawing in which Fig. 1 shows a cross-sectional view of one of my temperature measuring devices; Fig. 2 represents a device at normal temperature with the indicator in the reset position; Fig. 3 represents the same device when at an extreme temperature; and Fig. 4 represents the same device at normal temperature with the indicator recording an extreme temperature measurement. Figs. 5 and 7 represent different forms of friction indicators; Fig. 6 represents corrugations on the rod to produce holding friction for the collar; Fig. 8 shows a protective casing with temperature measuring device therein; and Fig. 9 shows a spiral form of indicator embodying my invention.

Referring now to Fig. 1, 10 represents a rod, preferably circular, of one material and 11 represents a tube of another material, the two materials having different temperature coefficients of expansion. For instance, for measuring relatively low temperatures up to 250° C. the rod 10 may be made of the nickel steel known as invar which has a negligible temperature coefficient of expansion and the tube 11 made of a highly expansive material such as aluminum. The tube fits over the rod with a sliding fit and the two are fastened together at one end as by welding at 12. The tube 11 is somewhat shorter than the rod such that the rod extends beyond the tube at that end where the tube and rod are not fastened together. For convenience I may call these the free ends to distinguish from the ends which are secured together. On the free end of rod 10 adjacent the free end of tube 11 is a collar or clip 13 which has a friction tight fit on the rod. I refer here to a fit sufficiently tight that the collar will not be displaced endwise of rod 10 by vibration or jarring under any temperature condition but which will permit of the collar being moved along the rod when force is applied for that purpose. The collar may be made of most any suitable material that will retain its shape under the temperatures to which the device is to be subjected but I prefer to make this collar of the same material as rod 10 so that they will have equal temperature coefficients of expansion.

If it be assumed that the rod 10 has a low or zero temperature coefficient of expansion and that the tube 11 has a high temperature coefficient of expansion, the device may be used as follows. When the device is at normal temperature or any temperature lower than that to be measured, the collar 13 is shoved tightly against the free end of tube 11 as in Figs. 1 and 2 and the device is then placed in the position where the extreme higher temperature is to be determined. For instance, it may be inserted into a small crevice in a dynamo electric machine or into a boiler or a liquid process bath, or into a furnace or in a gasoline engine combustion chamber. Upon being heated the tube 11 will expand more than rod 10 and it will force collar 13 along rod 10 towards the free end a distance proportional to the maximum temperature reached by the device during the measurement period. This condition is represented in Fig. 3. The test period may be only long enough for the device to assume the same temperature as its surroundings, that is a few minutes, or it may remain in test position for hours or weeks and removed for examination when it is convenient. Upon cooling to some definite normal temperature, the friction-tight collar 13 will remain at the position on rod 10 to which it was forced at the maximum temperature condition reached, but the tube 11 will contract relative to rod 10 to its original or normal temperature condition. This is the condition represented in Fig. 4. The spacing of the collar 13 from the free end of tube 11 is then a permanent indication and record of the maximum temperature reached by the device during the test period. I have found that this distance can be quite accurately measured in terms of extreme temperature by examination with a microscope having a calibrated micrometer eye piece. For example, with an extreme temperature measuring device of the character described having an overall length of one inch, I have been able to readily measure extreme temperatures with an error not exceeding 2 per cent.

It is immaterial what the temperature of the device is when originally set, so long as it is less than the extreme temperature to be recorded. It is, however, important to make the space measurement at some definite known temperature for which the space calibration of the device is known, but not necessarily at any particular temperature because the space measurement can always be correlated with the space-temperature calibration curve of the device. For convenience, in calibrating and making the space measurement, I may place fine graduation marks on adjacent surfaces of the collar 13 and tube 11, as represented at 14 and 15, Fig. 4. In placing these marks on the device, it will be found helpful to select spacing convenient to the scale in the microscope that is to be used in reading the device. A reference graduation line may also be marked on rod 10 as represented by the line 16, Fig. 4, and if a rod 10 and collar 13 having zero temperature coefficients of expansion are employed the spacing 14—16 represents the extreme temperature measurement regardless of the temperature at which the device is read. The spacing 15—16 also represents the temperature of the device when read and in any case renders it unnecessary to otherwise measure the temperature of the device when taking an extreme temperature reading.

For the measurement of higher temperatures than those hereinbefore mentioned, other material may be used. For example, the rod 10 might be a special nickel alloy steel and the outside member of pure nickel. Or, vitreous materials might be used where contact with corrosive atmospheres or liquids are expected. Quartz might be used for the inner rod 10 and a highly expansive glass for the tube 11. These are cited as representative materials and by no means cover the full range of those which might be used.

In the event that such devices are subjected to or assume temperatures beyond their normal range, which may partially destroy the element or impair its accuracy of indication, I may provide a washer shown at 17, made of a material havin a known melting point, the value of which is approximately at the upper temperature limit of the device. If, upon removal of the measuring unit from the apparatus under test, this washer is found to have melted, the observer can at once be suitably warned of what has happened and will not rely on the reading. The washer 17 will be so secured on the device as to prevent being knocked off by ordinary handling.

In cases where extreme temperatures below normal are to be measured, the device will have the inner rod 10 of a highly expansive material and the outer tube 11 of a lower expansive material. Such a device is used in the same way as mentioned above. For example, at any normal temperature, the collar 13 is pressed against the end of tube 11 and the device is then placed in the cold zone to be investigated. For example, the devices may be used to measure extreme cooling temperatures in various parts of a refrigerating system, or a number of devices may be lowered to different depths in the ocean to determine the ocean temperature at various levels. When removed and subjected to a known normal temperature, the collars 13 will be spaced from the tubes 11 by a distance proportional to the extreme colder temperatures to which the devices have been subjected. These temperatures may then be determined by observation through a suitable microscope and reference to a calibration chart.

To prevent too easy and unintentional displacement of the collar 13 on rod 10 any suitable frictional fit may be used. The collar 13 may be split as in Fig. 7 and sprung so as to grasp the rod 10 tightly. If a solid collar is used, the rod 10 may be corrugated as shown in Fig. 6 to provide a good frictional engaging surface with the collar. Likewise the corrugations may be made on the inside of the collar as shown in Fig. 5.

Where devices are to be used in places where, due to the nature of the materials used they might become corroded or where for sanitary or other reasons it is desirable to prevent contact between the device and the material under investigation, I may place the device in a sealed envelope, as represented in Fig. 8. The envelope will be made of a material which will not corrode or which is otherwise suitable for direct contact with the atmosphere, liquid, or other condition encountered. For example, glass envelopes may be used when investigating temperatures obtained in the freezing of ice cream and in many processes. The envelope may contain an air space selected to cause the incased device to float at the surface of certain liquids under investigation.

One great advantage of such temperature measuring devices it that due to their small size, low cost and rugged character they may be used in places and under conditions where other temperature measuring devices cannot be used. For example, in the manufacture of varnishes, compounds and plastics involving many steps and chemical and temperature changes, these devices may be thrown directly into the material being processed at different stages and be carried along with the material and removed at other points and the prevailing extreme temperatures of the different stages determined at leisure. They may be fed into a fuel-burning furnace with the fuel and removed with the ash to determine maximum combustion temperatures.

In cases where relatively small extreme temperatures are to be measured or where greater sensitivity is desired for any reason, the device may be made several inches or feet long and coiled in a spiral, as shown in Fig. 9. In Fig. 9, 18 represents the secured ends of the rod and tube, 19 the tube, 20 the rod and 21 the temperature indicating friction collar. The operation is the same as previously described but due to the greater length, larger measurement displacements are obtained for a given temperature measurement.

A device having an effective length of several feet may be coiled in a washer-shaped unit having an external diameter of about one inch. The tendency for the device to uncoil with increase in temperature is small due to the concentric disposition of the materials having the different temperature coefficients of expansion. It may be used with a flat, circular-shaped sealing case, if desired.

In Figs. 1 to 8, inclusive, the diameter of the device has been indicated considerably larger in proportion to the length of the device than is necessary in practice. This, however, is for better illustration purposes and while the device dimensioned as shown is perfectly operative, I prefer, in actual practice to make these devices of dimensions that would correspond roughly to those of an ordinary common pin without a head.

If, in any form of the invention described, the outer surface of the device be made dull, black and non-reflecting, the device would absorb, and its temperature would be raised by, radiant energy and in cases where the determination of radiant energy rather than ambient temperature is important, the device could be designed, calibrated and used for that purpose. The extreme temperature reached by the device would then correspond to the extreme radiant energy condition, which temperature might be considerably higher than the surrounding ambient temperature. Unless otherwise limited, the claims are intended to include use of the device for radiant energy investigations.

What I claim as new and desire to secure by Letters Patent of the United States is:

1. A portable extreme temperature measuring unit comprising a rod and a tube fitting over the rod with a sliding fit, said rod and tube being fastened together at one end and said rod extending beyond the tube at the other end, said rod and tube being made of materials having different temperature coefficients of expansion, and a collar fitted friction-tight on the extending end of said rod adjacent the tube end and being movable along said rod by said tube in response to relatively different changes in the lengths of said tube and rod by reason of temperature changes.

2. A portable extreme temperature measuring device comprising a rod and a tube fitting over the rod with a sliding fit, said rod and tube being fastened together at one end and said rod extending beyond the tube at the other end, a collar fitted friction-tight on the extending end of said rod adjacent the tube end, said tube having a higher temperature coefficient of expansion than said rod whereby said collar may be moved endwise on said rod by said tube upon an increase in temperature of said device and fusible indicator means secured to said device which melts at a temperature corresponding to approximately the upper temperatures measuring limit of said device.

3. A portable temperature measuring device comprising a rod, a tube having a sliding fit thereon, said tube and rod being secured together at one end and said rod extending beyond the tube at the other end, a collar fitting friction-tight on the extending end of the rod adjacent the tube end, said rod and collar having the same temperature coefficient of expansion and said tube having a different temperature coefficient of expansion, said parts being arranged so that the collar may be manually moved along the rod against the tube at a normal temperature and be moved along the rod in the opposite direction by said tube in response to an abnormal temperature and to remain in the extreme position so moved when the device returns to normal temperature, the spacing of said tube and collar then serving as an indication of the extreme abnormal temperature reached by said device.

4. An extreme temperature measuring and indicating device comprising a rod and a tube having a sliding fit and fastened together at one end, the rod extending beyond the tube at the other end, said rod and tube having different temperature coefficients of expansion, a collar fitting friction-tight on the extending end of said rod adjacent the tube end so as to be displaced along said rod by said tube by reason of unequal changes in the lengths of said tube and rod when subjected to a change in temperature and graduation marks on relatively movable parts of said device, including said collar to facilitate determining the position of said collar in terms of temperature.

5. An extreme low temperature measuring device comprising a rod having a positive temperature coefficient of expansion, a tube having a smaller temperature coefficient of expansion, said tube and rod having a sliding fit and being secured together at one end, said rod extending out of the other end of said tube, and a collar fitting friction-tight on the extending end of said rod adjacent the end of the tube thereon, said parts being arranged so that the collar may be manually moved along said rod up against the tube when the device is at one temperature and to be moved along the rod in the opposite direction by the tube in response to a lowering change in temperature.

6. An extreme temperature measuring and indicating device comprising a rod, a tube fitted on said rod with a sliding fit, said rod and tube being secured together at one end and said rod extending beyond the tube at the other end, said tube and rod being made of materials which have different temperature coefficients of expansion, a collar friction-tight on said rod at the extended end thereof adjacent the tube end, said tube and rod being coiled in the form of a spiral.

GEORGE F. GARDNER.